United States Patent [19]

Romberger

[11] Patent Number: 4,869,932
[45] Date of Patent: Sep. 26, 1989

[54] USE OF LOW MOLECULAR WEIGHT WATER-SOLUBLE ANIONIC POLYMERS AS BLOCKING AGENT FOR FIBERGLASS SIZING

[75] Inventor: John A. Romberger, Oak Park, Ill.

[73] Assignee: Nalco Chemical Company, Naperville, Ill.

[21] Appl. No.: 243,360

[22] Filed: Sep. 12, 1988

[51] Int. Cl.$^4$ .......................... B05D 1/18; B05D 3/00
[52] U.S. Cl. ....................................... 427/299; 65/3.4; 65/3.41; 162/156; 427/430.1; 428/392
[58] Field of Search ................. 65/3.4, 3.41; 162/107, 162/156, 164.2; 427/389.8, 393.1, 299, 430.1; 428/375, 392

[56] References Cited

U.S. PATENT DOCUMENTS

| | | | |
|---|---|---|---|
| 3,692,673 | 9/1972 | Hoke | 210/52 |
| 4,178,204 | 12/1979 | Chakrabarti | 162/156 |
| 4,703,092 | 10/1987 | Fong | 525/351 |
| 4,752,527 | 6/1988 | Sanzero et al. | 65/3.41 X |

FOREIGN PATENT DOCUMENTS 0225596  6/1987  European Pat. Off. .

Primary Examiner—Michael Lusignan
Attorney, Agent, or Firm—John G. Premo; Paul D. Greeley; Donald G. Epple

[57] ABSTRACT

A method of preventing the interaction of cationic softeners coated upon the surfaces of glass fibers with anionic polymers contained in aqueous baths used in forming the glass fibers into mats which comprises treating the fiber with at least 3 parts per million, of a water-soluble anionic vinyl polymer having a molecular weight range of from 500–50,000.

15 Claims, No Drawings

USE OF LOW MOLECULAR WEIGHT WATER-SOLUBLE ANIONIC POLYMERS AS BLOCKING AGENT FOR FIBERGLASS SIZING

INTRODUCTION

The fiberglass mat industry uses 1¼" fiberglass to make mats. This fiberglass is coated with a sizing that consists of an alkylsiloxane, polyvinyl alcohol, a bacteriocide, and an antistatic compound. The antistatic compound, usually cationic softener, is a large cationic molecule that imparts a positive charge to the fiber. When making fiberglass mat, the manufacturers put the fibers in a water system containing a long-chain anionic viscosity modifier, such as a water-soluble acrylic acid polymer. The viscosity modifier and the cationic softener can interact to cause a precipitate to form. The resulting precipitate can interfere with the mat manufacturing and stain the final product.

THE INVENTION

This invention uses low molecular weight water-soluble anionic vinyl polymers having a weight average molecular weight range of from 500–50,000 to prevent the cationic softener from interfering with the viscosity modifier.

Specifically, the invention provides a method of preventing the interaction of cationic softeners coated upon the surfaces of glass fibers with anionic polymers contained in aqueous baths used in forming the glass fibers into mats which comprises treating the fiber with at least 3 parts per million, of low molecular weight water-soluble anionic vinyl polymers having a weight average molecular weight range of from 500–50,000.

The Cationic Softeners

These materials are well known and are usually fatty amines and preferably their quaternary ammonium salts. Illustrative of such compounds would be stearyl trimethyl ammonium chloride. Similarly, fatty imodazolines and their quaternary ammonium salts may be employed.

The Viscosity Modifiers

These polymers generically are high molecular weight, e.g. greater than 500,000 (weight average), anionically charged, water-soluble polymers. Preferred are the acrylic acid polymers which are copolymerized with between 10–80% by weight of acrylamide and have a molecular weight greater than 1,000,000.

The Low Molecular Weight Water-Soluble Anionic Polymers

These polymers, as indicated, have molecular weights ranging between 500–50,000, with a preferred molecular weight range being within the range of 1,000–30,000.

These polymers, in a preferred form of the invention, may be homopolymers or copolymers of vinyl carboxylate-containing monomers. "Carboxylate-containing monomers" means that the carboxylic acid groups are either in the form of the free acid or of a water-soluble salt thereof such as alkali metal, ammonia or amine.

Thus, the homopolymers of acrylic acid, methacrylic acid, maleic acid, fumaric acid, itaconic acid, and the like may be used.

In addition to using these homopolymers, water-soluble copolymeric forms may also be employed. When the copolymers are used, the amount of carboxylate should be at least 30% by monomer weight ratio of the copolymers.

A preferred group of carboxylate polymers are those derived by the hydrolysis of the corresponding polyacrylamides. These materials, after either caustic or acid hydrolysis, will contain between about 10–30% by weight of amide groups. A most preferred group of carboxylate polymers are those obtained by polymerizing acrylic acid with acrylamide at 3:1 monomer weight ratio.

In addition to the polymers described above, other water-soluble anionic vinyl polymers that may be used are the polymers containing sulfonate groups as described in Hoke, U.S. Pat. No. 3,692,673, which is incorporated herein by reference. Other sulfonated polymers are those described in U.S. Pat. No. 4,703,092 and European Patent Publication No. 0 225 596, both of which also are incorporated herein by reference.

Dosage

The dosage of the polymers should be at least 3 ppm based on the weight of the total system. Generally, the dosage will be within the range of 5–50 ppm. The polymers may be added to the fibers directly before they are placed in the aqueous bath with the viscosity modifier or they may be added to the bath.

Evaluation of the Invention

Two low molecular weight water-soluble anionic polymers were tested.

Composition 1

This polymer contained 13% of an isopropanol terminated 13% sodium polyacrylate solution having a molecular weight of 2,500.

Composition 2

Composition 2 is an aqueous solution which contains 21.79 weight % of a partially hydrolyzed polyacrylamide containing 66 mole % acrylic acid sodium salt and 1.13 weight % of vinyl sulfonate-acrylic acid copolymer (1:3 weight ratio) and having a weight average molecular weight of about between 10–30,000.

A high molecular weight polymer sold for fiberglass dispersion, is added to a water solution of Cationic Softener X, a gumball forms. This simulates what happens in the whitewater to form the slime problem. When this experiment is done with Composition No. 2, a cloudy precipitate forms, and this precipitate will not settle. No precipitate forms when the experiment is done with Composition No. 1. It is probable that the polymers in Composition No. 1 and 2 both associate with the Cationic Softener X, but only the higher molecular weight polymer forms a visible precipitate. More importantly, neither forms the gumball that is formed with the high molecular weight dispersant polymer.

Having thus described my invention, I claim:

1. A method of preventing the interaction of cationic softeners coated upon the surfaces of glass fibers with high molecular weight anionic polymers having a molecular weight greater than 500,000 contained in aqueous baths used in forming the glass fibers into mats which comprises:

treating the fiber coated with said cationic softener with at least 3 parts per million, of a water-soluble anionic vinyl polymer having a molecular weight range of from 500–50,000; and immersing said fiber coated with said cationic softener into said aqueous bath of said high molecular weight anionic polymer.

2. The method of claim 1 where the water-soluble anionic vinyl polymer contains at least 30% by weight of carboxylate functionality.

3. The method of claim 1 where said high molecular weight anionic polymer is an acrylic acid polymer.

4. The method of claim 3 where said acrylic acid polymer is a copolymer of acrylic acid and between about 10–80% by weight of acrylamide, having a molecular weight greater than about 1,000,000.

5. The method of claim 1 where said anionic vinyl polymer has a molecular weight in the range of about 1,000 to about 30,000.

6. The method of claim 1 where said anionic vinyl polymer is either a homopolymer or copolymer of vinyl carboxylate-containing monomers.

7. The method of claim 6 where said homopolymer is selected from the group consisting of: acrylic acid, methacrylic acid, maleic acid, fumaric acid, and itaconic acid.

8. The method of claim 6 where said anionic vinyl polymer is a copolymer of acrylic acid and acrylamide having a monomer weight ratio of about 3:1.

9. The method of claim 1 where said anionic vinyl polymer is a water-soluble sulfonate polymer.

10. The method of claim 9 where said water-soluble sulfonate polymer is selected from the group consisting of: acrylamido sulfonic acids and their salts, and sulfomethylpolyacrylamide.

11. The method of claim 1 where said fiber is treated with said water-soluble anionic vinyl polymer in the range between about 5–50 ppm.

12. The method of claim 1 where said anionic vinyl polymer is added to said fiber prior to placing said fiber into said aqueous bath.

13. The method of claim 1 where said anionic vinyl polymer is added to said aqueous bath.

14. The method of claim 1 where said anionic vinyl polymer is a solution containing about 13% of an isopropanol terminated 13% sodium polyacrylate having a molecular weight of about 2500.

15. The method of claim 1 where said anionic vinyl polymer is an aqueous solution which contains about 21.79 weight % of a partially hydrolyzed polyacrylamide containing about 66 mole % acrylic acid sodium salt and about 1.13 weight % of vinyl sulfonate-acrylic acid copolymer and having a weight average molecular weight of between about 10 to about 30,000.

* * * * *